United States Patent
Yamamoto et al.

(10) Patent No.: US 7,471,198 B2
(45) Date of Patent: *Dec. 30, 2008

(54) MACHINE COMPONENT WITH IC TAG ATTACHED THERETO

(75) Inventors: Naota Yamamoto, Kuwana (JP); Ken Horiuchi, Kuwana (JP); Koushirou Fujimoto, Kuwana (JP); Yoshihisa Shibuya, Kuwana (JP); Makoto Muramatsu, Iwata (JP)

(73) Assignee: NTN Corporation, Osaka (JP)

( * ) Notice: Subject to any disclaimer, the term of this patent is extended or adjusted under 35 U.S.C. 154(b) by 127 days.

This patent is subject to a terminal disclaimer.

(21) Appl. No.: 10/570,982

(22) PCT Filed: Sep. 7, 2004

(86) PCT No.: PCT/JP2004/012963

§ 371 (c)(1),
(2), (4) Date: Mar. 8, 2006

(87) PCT Pub. No.: WO2005/024534

PCT Pub. Date: Mar. 17, 2005

(65) Prior Publication Data

US 2006/0289620 A1    Dec. 28, 2006

(30) Foreign Application Priority Data

Sep. 9, 2003 (JP) .............................. 2003-316288

(51) Int. Cl.
*G08B 13/14* (2006.01)
*G08B 21/00* (2006.01)
*F16C 19/00* (2006.01)

(52) U.S. Cl. ............... 340/572.1; 340/572.8; 340/682; 340/679; 340/686.3; 340/5.92; 705/28; 235/385; 384/91

(58) Field of Classification Search ............... 340/572.1
See application file for complete search history.

(56) References Cited

U.S. PATENT DOCUMENTS 6,239,737 B1 * 5/2001 Black .......................... 342/51

(Continued)

FOREIGN PATENT DOCUMENTS

CN    1439999    9/2003

(Continued)

OTHER PUBLICATIONS

International Search Report for PCT/JP2004/012963 dated Nov. 16, 2004 (2 pages).

(Continued)

*Primary Examiner*—Donnie L Crosland
(74) *Attorney, Agent, or Firm*—Osha • Liang LLP

(57) ABSTRACT

To provide a machine component with an IC tag affixed thereto, in which with the IC tag having an increased storage capacity, the IC tag can be mounted with no difficulty and, also, reading or writing of information from or in the IC tag, respectively, can be facilitated. A plurality of IC tags 2 are attached to a machine component, which forms a part of a rolling bearing assembly 1, or to a machine component and an accessory with division made therebetween. Those plural IC tags 2 have different information stored therein. Where the machine component is a retainer incorporated rolling bearing assembly 1, those plural IC tags are attached to a roller retainer 5 at respective locations symmetrical with each other about the axis O of rotation thereof.

9 Claims, 7 Drawing Sheets

U.S. PATENT DOCUMENTS

| | | | |
|---|---|---|---|
| 6,480,699 B1 * | 11/2002 | Lovoi | 455/41.2 |
| 6,486,780 B1 * | 11/2002 | Garber et al. | 340/572.1 |
| 6,520,544 B1 * | 2/2003 | Mitchell et al. | 283/70 |
| 6,843,628 B1 * | 1/2005 | Hoffmeister et al. | 411/14 |
| 2002/0186134 A1 | 12/2002 | Rehfus et al. | |
| 2003/0156401 A1 | 8/2003 | Komine et al. | |
| 2006/0170551 A1 * | 8/2006 | Nakamura et al. | 340/572.1 |

FOREIGN PATENT DOCUMENTS

| | | |
|---|---|---|
| JP | 2001-330014 | 11/2001 |
| JP | 2002-41116 | 2/2002 |
| JP | 2002-49900 | 2/2002 |
| JP | 2002-292833 | 10/2002 |
| JP | 2003-44119 | 2/2003 |
| JP | 2003-67683 | 3/2003 |
| JP | 2003-242469 | 8/2003 |
| JP | 2004-54158 | 2/2004 |

OTHER PUBLICATIONS

Patent Abstracts of Japan 2003-044119 dated Feb. 14, 2003 (2 pages).
Patent Abstracts of Japan 2003-067683 dated Mar. 7, 2003 (2 pages).
Patent Abstracts of Japan 2002-292833 dated Oct. 9, 2002 (2 pages).
Patent Abstracts of Japan 2002-041116 dated Feb. 8, 2002 (2 pages).
Patent Abstracts of Japan 2002-049900 dated Feb. 15, 2002 (2 pages).
Patent Abstracts of Japan 2004-054158 dated Feb. 19, 2004 (2 pages).
Chinese Office Action for Chinese Application No. 200480025892.5, mailed on Dec. 28, 2007 (9 pages).
esp@cenet patent abstract for Chinese Publication No. 1439999, Publication date Sep. 3, 2003 (2 pages).
Patent Abstracts of Japan for Japanese Publication No. 2001-330014, Publication date Nov. 30, 2001 (1 page).

* cited by examiner

MACHINE COMPONENT WITH IC TAG ATTACHED THERETO

FIELD OF THE INVENTION

The present invention relates to a machine component having an IC tag attached thereto such as, for example, a rolling bearing assembly having an IC tag attached to a component thereof or an accessory thereto.

BACKGROUND ART

It is generally well known that machine components such as, for example, bearing assemblies have significant pieces of information affixed thereto: Some of those pieces of information include part of the model numbers and are marked by stamping on an outer surface area of the machine component and some others recorded in documents that are separately replaced and stored. Those piece of information affixed to the machine components include, in the case of bearing assemblies, design information such as, for example, gap precision, material used to form each machine component, type of heat treatment used and description of grease filled, and/or management codes such as, for example, manufacturer's production number and customer's parts number. Additional information concerning customer's products, that is, machines and equipments, in which machine components such as, for example, bearing assemblies have been incorporated, is also stored in documents separately.

On the other hand, microelectronic IC tags have now been developed, making it possible to easily store and electronically collate various attribute information. Even the attribute information of components of bearing assemblies, if the IC tags are attached to those bearing components, has come to be easily managed and controlled. In addition, it can be applied to management of order placement and delivery and inventory management. (Japanese Laid-open Patent Publication No. 2002-49900)

Also, bearing assemblies designed to meet a special internal specification are generally delivered to customers in the form as enclosed within a bearing box together with a manual or instructions describing cares and cautions to be taken into consideration during the handling of the respective bearing assembly. Specifically, this manual describes cares and cautions (such as, for example, "Avoid shocks and impacts") to be taken when the package is unwrapped, when the bearing assembly is incorporated in a machine and/or during storage of the bearing assembly. This type of manual is stored in a customers maintenance department or the like, but is generally discarded at an appropriate timing after the bearing assembly has been replaced with a new one. Accordingly, when the bearing assembly getting deteriorated with passage of time of use has to be replaced with a new one, the bearing assembly having the same specification as that of the bearing assembly to be replaced must be selected in anticipation of the replacement. In the customers maintenance department of the bearing manufacturer, maintenance of the respective specifications of the bearing assemblies being operated is indeed loaded. On the other hand, those machines and equipments are routinely inspected as to the presence or absence of an abnormality occurring in the bearing assemblies each time they are operated a predetermined distance. In general, such inspection is directed to vibrations and/or temperature rises occurring in the vicinity of the bearing assemblies. The job of inspection for that purpose often involves a work under a quite inadequate environment and/or a dangerous work, and reduction and simplification of the manufacturing steps are strongly desired accordingly. Although the foregoing problems have been discussed as being found where the machine component is a bearing assembly, problems similar to those discussed above may be equally found with any other machine components such as, for example, shaft couplings and motors that tend to deteriorate naturally with passage of time of use.

In the face of those problems discussed above, the applicant of this application has suggested (in, for example, the Japanese Laid-open Patent Publication No. 2004-54158) the handling manual of a kind having a display module for presenting the status of deterioration of the machine component. The suggested handling manual is in the form of a sticker in which handling instructions, model number, specification and others are described and is pasted to a machine incorporating the machine component so that when deterioration of such machine component is found during the routine inspection of the machine, arrangement can be efficiently made to secure necessary replacement parts (parts model number) from the manufacturer of the machine component.

When it comes to attachment of an IC tag to a machine component, not only is the site of placement limited, but the outside dimensions of the IC tag that can be attached to the machine component is limited. However, if a small IC tag is used, the storage capacity thereof is indeed small and it may occur that a sufficient amount of information cannot be stored in it. The use of a large IC tag to increase the storage capacity will result in such problems and inconveniences that part of the IC tag may protrude outwardly to form an obstacle to the neighboring parts and that the presence of a hole or recess for accommodating the IC tag may decrease the strength of the machine component. Where the IC tag is attached to the machine component, it is desirable to mount the IC tag on a portion of the machine component or its peripheral part that does not affect the strength and the precision, but where that portion of the machine component or its peripheral part is a rotatable element such as, for example, a roller retainer or cage employed in a rolling bearing assembly, mounting of the IC tag will eventually lead to disruption of a balance of the mass, accompanied by reduction in performance of the machine component.

Also, with the handling manual of the kind having the display module for presenting the status of deterioration as discussed above, it can serve the expected purpose if and so long as the machine or equipment is used within an agreeable environment such as, for example, an indoor space, but where the machine or equipment is used in the outdoor space, the handling manual may be susceptible to contamination and/or breakage that lead to the incapability of reading the part model number and the specification. In particular, if the part model number is hard to make out, particulars of the machine bearing such part model number have to be jotted down in a memo so that when the servicing person gets back to an office, he or she can make a reconfirmation of the part model number of the machine component in trouble by reading a maintenance document. By way of example, the iron and steel manufacturing equipment is generally full of powder dust, metallic powder (scale) and/or pulp chaff and railway vehicles are susceptible to contamination brought about by rain and powder dust, and it is therefore quite often that the part model number and the specification both referred to above will be hard to make out or incapable of being deciphered quickly.

Yet, in the conventional art, when it comes to attachment of the IC tag to a packaging container or the like of the machine component, the IC tag is so small as to pose a problem associated with handling thereof and, therefore, not only is the attachment complicated and time-consuming, but also the IC tag is hard to be reused.

DISCLOSURE OF THE INVENTION

An object of the present invention is therefore to provide a machine component with an IC tag affixed thereto, in which with the IC tag having an increased storage capacity, the IC tag can be mounted with no difficulty and, also, reading or writing of information from or in the IC tag, respectively, can be facilitated.

Another object of the present invention is to substantially eliminate the possibility of the unbalanced revolution, which may occur when the IC tag is mounted on a rotatable component part of the machine component.

A further object of the present invention is to enable contents of the handling manual to be presented easily and, also, to enable the handling manual to be retained semipermanently in a discernable form.

A still further object of the present invention is to enable the status of deterioration of the machine component to be ascertained easily.

A yet further object of the present invention is to enable the easy mounting of the IC tag on a packaging container of the machine component and also to facilitate the reuse of such IC tag.

An IC tag equipped machine component of the present invention includes a plurality of IC tags attached to a machine component or to a machine component and an accessory with division made therebetween, which tags having different information stored therein.

According to the present invention, since the information is recorded on a subdivided basis in the plural IC tags, as compared with the provision of a single IC tag of a large storage capacity, a large amount of information can be recorded with no difficult in selecting the site of attachment thereof in the machine component. Also, the plural IC tags can be utilized according to applications and information reading from and writing in the IC tags can be facilitated.

By way of example, one of the plural IC tags may have an administrative information on the side of a parts manufacturer recorded therein at the time of delivery of the machine component and the other of the plural IC tags may be left empty. By so doing, the following effects can be expected. For example, it may be a machine component including IC tags and having a storage capability, which can be utilized for control of arbitrary information required on the part of the customer. For this reason, it becomes the machine component having the storage capability and, hence, along with increase of the function as the machine component, the added value thereof can also be increased. Also, if the customer parts number exchanged with the parts manufacturer at the site of the customer is inputted, what is required in connection with the machine component itself can be managed. As a result, no job of replacing the custom parts number and the parts model number is needed, facilitating simplification of placement of orders of the machine components. Since a business of placing orders of bearing assemblies or the like is carried out by selectively specifying a large amount of model numbers or the like, such business has hitherto been considered extremely complicated and time-consuming, accompanied by frequent errors, but the utilization of the plural IC tags as discussed above is effective to facilitate placement of order without any error.

In the present invention, the machine component may include a rotatable component part. In such case, the plural IC tags may be attached to the rotatable component part at respective locations symmetrical with each other about an axis of rotation.

In the case of this construction, since the plural IC tags are disposed in symmetrical relation with each other about the axis of rotation, disruption of the balance of rotation can be avoided. Also, since the plural IC tags are attached, the amount of information that can be stored can be increased while utilizing the compact IC tags. For this reason, without incurring reduction in performance, a large amount of information can be recorded with the IC tags attached to the rotatable component parts.

Where as discussed above the IC tags are attached in symmetrical relation about the axis of rotation, the machine component may be a rolling bearing assembly having a roller retainer and the rotatable component part may then be the roller retainer.

In terms of precision, material, limitations in attaching such as a housing, the processability and/or the stability, of the various component parts of the rolling bearing assembly, attachment of the IC tags to the roller retainer is feasible as it is quite easiest to attach the IC tags to the roller bearing and an excellent performance can be brought about, as compared with attachment of the IC tags to a raceway member or a sealing member. However, the roller retainer undergoes revolution and the unbalance in weight may result in reduction of the bearing performance. Despite those problems, attachment of the IC tags at the respective locations symmetrical with each other about the axis of rotation as discussed above is effective to secure the balance of rotation and attachment of the IC tags to the roller retainer will become practically excellent.

Where the IC tags are attached to the roller retainer, the number of the plural IC tags attached to the roller retainer may be two and those two IC tags may then be attached spaced 180 degrees from each other about the axis of rotation. In this case, the roller retainer can be obtained, to which the IC tags can easily be attached and which exhibits a stabilized rotation.

In the present invention, one of the IC tags may have recorded therein handling instructions associated with the machine component.

The handling instructions referred to above are generally described in the handling manual packaged together with the machine component part, but if the handling instructions are stored in the IC tags attached to the machine component or its accessory, the necessity of any dedicated handling manual can be dispensed with and, also, the inconvenience associated with storage of the handling manual after the machine component has been installed in a machine can be eliminated.

In the present invention, the accessory referred to above may be a handling manual of the machine component. In such case, the handling manual may include one of the plural IC tags, which stores therein contents of how to handle the machine component, and a deteriorating status display module for presenting the status of deterioration of the machine component. This handling manual is adapted to be attached to a machine incorporating the machine component or to the machine component itself.

In the case of this construction, since the handling manual is attached to the machine component itself or the machine incorporating the machine component, the handing instructions associated with the machine component can be recorded and stored assuredly with no possibility of being lost. Also, since it is equipped in the machine or the like, unlike the case in which it is stored in a storage shelf provided separately, everybody can readily ascertain the handing instructions in situ, that is, at the site where the machine is arranged. In addition, since the handling manual is provided with the deteriorating status display module, the status of deterioration can readily be ascertained when one view such deteriorating status display module at the time of inspection. Since the handling description of the machine component is combined with the deteriorating status display module capable of presenting the status of deterioration of such machine component, as compared with the case in which the deteriorating status display alone is provided, not only can the status of deterioration of what be easily recognized, but the necessity of providing separately from the deteriorating status display module, a description of what the deteriorating status display module is provided for, can be dispensed with. Also, both of the handling description and the deteriorating status display module can be attached all at one time, thus eliminating complicated and time-consuming procedures and, at the same time, minimizing the site of attachment.

In particular, since the IC tag is provided in the handling description, the description can be electronically read out even though a surface of the description in the form of a sticker or the like is so contaminated as to render it to be illegible. Also, since the description can be electronically read out, it is possible to make, in situ, a reference about the availability of the replacement parts and/or to make a delivery arrangement to the manufacturer of the machine components and, therefore, the required documentation can be quickly performed and any possible error in transcribing records such as parts model number can be completely avoided.

In the present invention, the accessory referred to above may be a package contents display item to be attached to a packaging container of the machine component and one of the IC tags may be attached to this package contents display item.

When one of the plural IC tags is attached to the package contents display item, reading and writing of the information to be recorded can easily be accomplished.

The package contents display item may be a rivet having a needle portion and a head portion and wherein the IC tag is embedded in the head portion.

With the rivet, removal or attachment of the IC tag relative to a packaging container such as a wooden box can readily be accomplished. For this reason, reuse of the IC tag can be facilitated.

An IC tag equipped handling manual of the present invention is a handling manual for the machine component tending to deteriorate with passage of time of use thereof and includes an IC tag having stored therein contents of how to handle the machine component and a deteriorating status display module for presenting the status of deterioration of the machine component.

According to this IC tag equipped handling manual, various functions and effects similar to those discussed in connection with the IC tag equipped machine component provided with the handling manual as discussed hereinabove can be equally obtained.

An IC tag equipped rivet of the present invention includes a needle portion, a head portion and an IC tag embedded in the head portion.

According to this IC tag equipped rivet, various functions and effects similar to those discussed in connection with the IC tag equipped machine component provided with the handling manual as discussed hereinabove can be equally obtained.

Since the IC tag equipped mechanical component of the present invention is such that a plurality of IC tags are attached to a machine component or to a machine component and an accessory with division made therebetween and different information is stored in those IC tags, the IC tag can be mounted with no difficulty while the storage capacity of the IC tag is increased and, also, reading or writing of information from or in the IC tag, respectively, can be facilitated.

Where the machine component includes a rotatable component part and the plural IC tags are attached to the rotatable component part and positioned in symmetrical relation with each other about an axis of rotation, it is possible to avoid disruption of the balance of rotation.

Where one of the IC tags has recorded therein handling instructions associated with the machine component, contents of the handling manual can be presented easily and, also, the handling manual can be retained semipermanently in a discernable form.

Where the accessory is a handling manual of the machine component and the handling manual includes one of the plural IC tags, and a deteriorating status display module for presenting the status of deterioration of the machine component and handing instructions associated with the machine component are stored in such one of the plural IC tags and where the handling manual is adapted to be attached to a machine incorporating the machine component or to the machine component itself, the status of deterioration of the machine component can easily ascertained.

Where the package contents display item, which forms the accessory referred to above, is a rivet having a needle portion and a head portion and the IC tag is embedded in the head portion, a job of attaching the IC tag to the packaging container for the machine component can be accomplished easily and, also, the reuse of the IC tag can be facilitated.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Figure 1A:
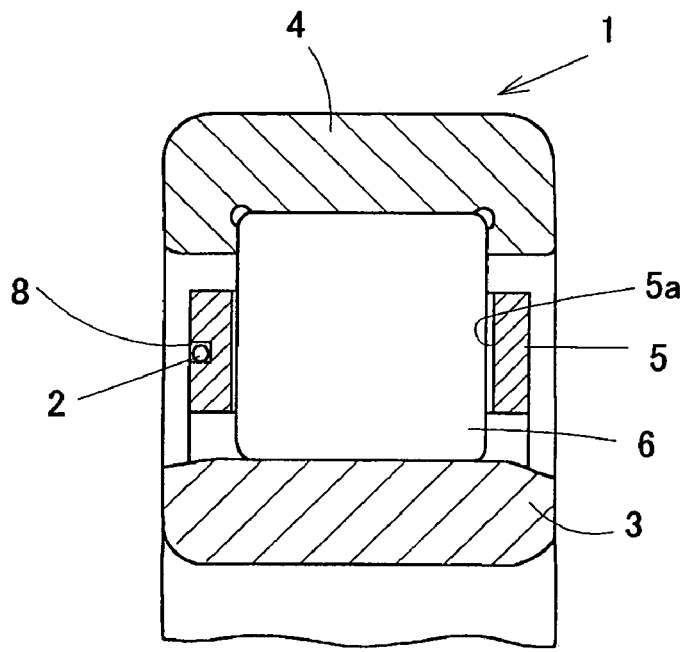
FIG. 1A illustrates a fragmentary sectional view of a bearing assembly, which forms a machine component with an IC tag attached thereto, according to a first preferred embodiment of the present invention and a perspective view of a roller retainer employed therein.
Figure 1B:
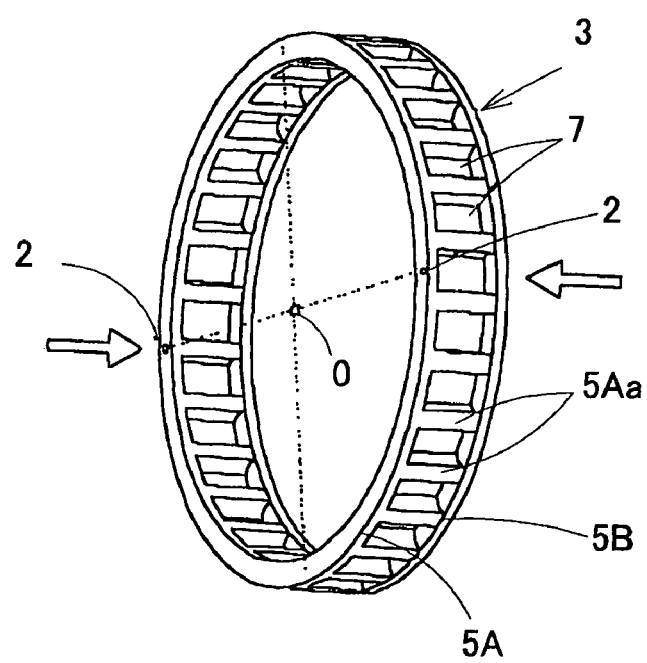
FIG. 1B is a perspective view of a roller retainer employed therein.

A first preferred embodiment of the present invention will be described in detail with particular reference to FIGS. 1A to 3. The IC tag-equipped machine component shown therein is in the form of a rolling bearing assembly 1, which forms a machine component, having a plurality of IC tags 2 attached thereto. The rolling bearing assembly 1 is of a type including a row of rolling elements 6 retained by a roller retainer 5 and interposed between an inner race 3 and an outer race 4. No sealing member is employed and the roller retainer 5 is exposed to the outside through opposite annular open ends of the rolling bearing assembly 1. Although the rolling bearing assembly 1 may be a cylindrical roller bearing, a tapered roller bearing, a deep groove ball bearing or an angular contact ball bearing, the cylindrical roller bearing is employed in the illustrated embodiment as an example of the rolling bearing assembly 1. Also, although the inner race 3 is shown as a collarless type and the outer race 3 is shown having collars, a combination of a collared inner race 3 and a collarless outer race 4 or a combination of collared inner and outer races 3 and 4 may be employed.

The roller retainer 5 is of a ring-shaped configuration having pockets 7 defined therein in a row extending in a direction circumferentially thereof for accommodating the respective rolling elements 6 therein and is generally referred to as a ladder type roller retainer. This roller retainer 5 is a machined retainer that is manufactured by means of, for example, a machining technique and is made of a metallic material such as, for example, a copper alloy or the like. In the illustrated embodiment, the roller retainer 5 is made up of left and right ring-shaped side plates 5A and 5B and a plurality of pillars 5Aa protruding from one of the side plates, for example, the side plate 5A and connecting the side plates 5A and 5B together, with each pocket 7 defined between the neighboring pillars 5Aa. Other than this type of roller retainer, a roller retainer made by means of a press work or made of a synthetic resin may be equally employed.

Each of the IC tags 2 is embedded within a respective mounting hole 8 defined in an end face of the roller retainer 5 and fixed in position by means of a resinous molding or the like. The mounting holes 8 are defined in one of the side plates, for example, the side plate 5A and have a round or rectangular cross-section. The mounting holes 8 are positioned at respective locations that lie circumferentially of the roller retainer in symmetrical relation with respect to the axis O of rotation of the roller retainer 5, with each IC tag embedded within the corresponding mounting hole 8. The axis O of rotation of the roller retainer coincides with the geometric center of the circle represented by the roller retainer 5. In the illustrated embodiment, two mounting holes 8 are shown as employed, which are spaced 180 degrees from each other in a direction circumferentially of the roller retainer 8. Those mounting holes 8 are of the sake size and shape.

Figure 2:
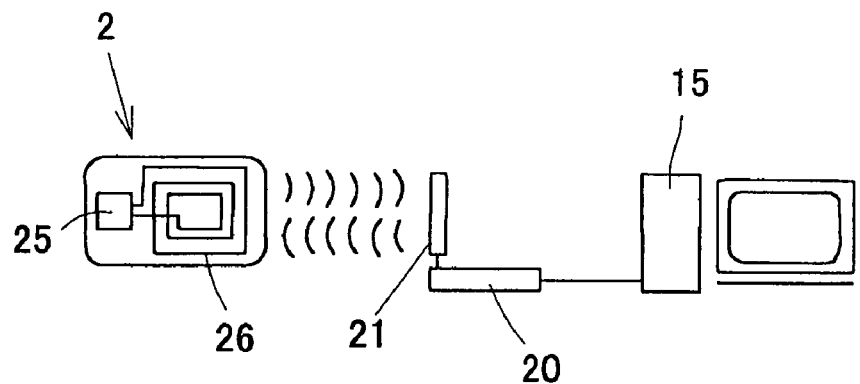
FIG. 2 is an explanatory diagram showing the relation between the IC tag and a tag read/write device.

Recording or reading of information in or from each of the IC tags 2 is carried out by the use of an IC tag read/write device 20 as shown in FIG. 2. This IC tag read/write device 20 includes an antenna 21 directed towards the IC tags 2. The IC tag read/write device 20 is electrically connected with a computer controlled information processing device 15. This IC tag read/write device 20 may be of a handy type equipped with an information processing module.

The IC tags 2 is of a type in or from which information can be recorded or read on a non-contact basis, respectively, and includes an IC chip (integrated circuit chip) 25 and an antenna 26. The IC chip 25 and the antenna 26 are enclosed together in a unitary body by means of a synthetic resin (not shown). The IC tag is generally available in numerous types, shapes and sizes, some in the form of a plate and some in the form of a spherical or anglewise shape in a size smaller than 1 mm. Also, the IC tag is generally available having a varying storage capacity, but the size and shape may be suitably selected depending on the nature of an object to which it is attached. Where the IC tag is desired to be attached to the roller retainer 5 of the rolling bearing assembly 1 such as in the illustrated embodiment, the IC tag is preferably small in size. For the IC tags 2, an RFID tag may be employed, which makes use of the RFID (Radio Frequency Identification) technology. The RFID type IC tag is operable with a varying transmission system such as based on an electrostatic coupling, electromagnetic coupling, electromagnetic induction, microwave and light and any of those transmission systems may be employed, but the transmission system based on the electromagnetic induction can be suitably employed. Also, the IC tags 2 are available in a type that can be practically employed in the environment full of metals and the use of such IC tags 2 operable in the presence of metals are preferred where they are to be fitted to the rolling bearing assembly 1.

Figure 3:
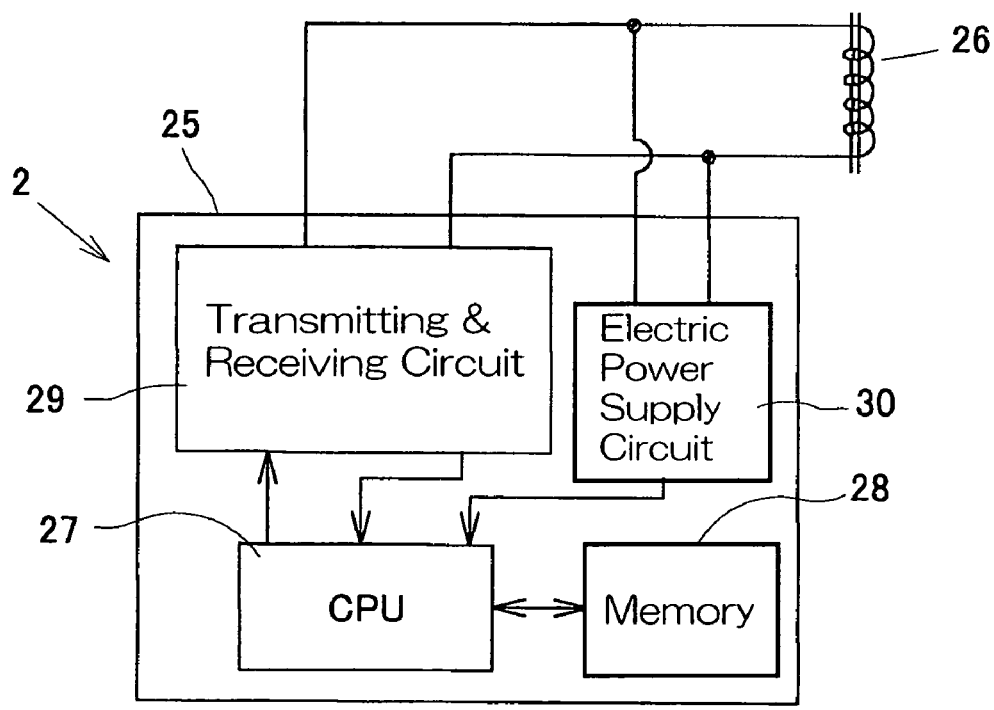
FIG. 3 is a block diagram showing an example of the circuitry of the IC tag.

FIG. 3 illustrates a specific example of the circuitry of each of the IC tags 2. The IC chip 25 employed in the respective IC tag 2 includes a central processing unit (CPU) 27, a memory 28, a transmitting and receiving circuit 29 and an electric power supply circuit 30 powered by an electric power fed from the antenna 26. The memory 28 is of a type that requires no electric power for the storage of information.

The manner of use, function and effects of the IC tag-equipped rolling bearing assembly of the structure described hereinabove will now be described. At the time of delivery of the rolling bearing assembly, one of the two IC tags 2 attached to the roller retainer 5 has management information stored therein for the convenience of or use by the bearing manufacturer and the other of the IC tags 2 is left vacant, i.e., has no information stored therein. The management information for the convenience of the bearing manufacturer includes, for example, bearing identifying number, lot number and other pieces of information descriptive of attributes of the bearing assembly.

This may bring about the following effects.

Since the rolling bearing assembly 1 may be regarded as having a storage function, some pieces of the management information that are required on the part of the customer can be utilized by the customer. Accordingly, not only is an improvement in functionality as the rolling bearing assembly having a storage function available, but also the rolling bearing assembly can have an added value.

If the parts number unique to the customer exchanging with the parts manufacturer is inputted on the part of the customer, arrangement of the bearing assembly of the required model number can be made from the bearing assembly itself. As a result thereof, a job of substituting the customer's parts number with the bearing model number or any other similar job will be no longer required and the business of ordering the bearing assemblies can be simplified. Considering that the business of ordering the bearing assemblies is required to be performed with a variety of model numbers specified and has hitherto been considered very complicated and time-consuming, accompanied by errors, but the use of the plural IC tags 2 in the manner described hereinabove is effective to facilitate the ordering business with no error involved.

Also, according to the foregoing construction, it is possible to eliminate the possible unbalanced revolution of the roller retainer 5 because the plural IC tags 2 are provided in the roller retainer 5 at the respective locations symmetrical with respect to the axis O of rotation of the roller retainer 5 and molding resin used to fill up the mounting holes 8 accommodating therein those IC tags 2 are provided similarly symmetrical with respect to the axis O of rotation of the roller retainer 5. In addition, since the use is made of the plural IC tags 2, one of those plural IC tags 2 may be an inexpensive IC tag dedicated for use in information read-out. In other words, one of those plural IC tag may be a memory including an IC chip in the form of a read-only memory. Also, since two or more IC tags 2 are employed, no problem will arise, which is associated with insufficient storage capacity relative to the amount of information on attributes of the bearing assembly 1.

Since the IC tags 2 are attached to the roller retainer 5, the following advantages can also be obtained. Specifically, where the IC tags 2 are to be attached to the bearing assembly, the convenience of reading the information stored in each of the IC tags 2 would be enhanced if they are disposed in the end face of the bearing assembly. However, this cannot be easily achieved since the inner and outer races 3 and 4 are generally held in engagement with a shoulder defined in a bearing box or a shoulder defined in a shaft. Also, where the IC tags are to be attached to a sealing member fitted to the outer race 4 or the like, it will be indirectly fitted relative to the inner and outer races 3 and 4 and will hence be held instable.

Although fitting of the IC tags 2 to the roller retainer 5 does not pose any problems discussed above, such fitting may constitute a cause of disruption of the balance of rotation due to revolving motion of the roller retainer. However, in the illustrated embodiment, the IC tags 2 are attached to the roller retainer 2 at the respective locations symmetric with respect to the axis O of rotation as hereinbefore discussed, the balanced rotation can be secured. Also, where the IC tags 2 are attached to the roller retainer 5, such attachment appears to be superior in terms of strength and processability to the case where they are attached to any raceway member.

The information to be stored in the IC tags 2 may include contents of a handling manual setting forth how to handle the rolling bearing assembly 1. The contents of the handling manual may be those that are to be described in the handling manual according to the embodiment which will be described subsequently. If the contents of the handling manual are stored in at least one of the IC tags 2 both attached to the rolling bearing assembly 1, not only can the necessity of a dedicated handling manual be dispensed with, but inconveniences incurred in storing the handling manual after the IC tags 2 have been fitted to the rolling bearing assembly 1 can also be eliminated.

Figure 10A:
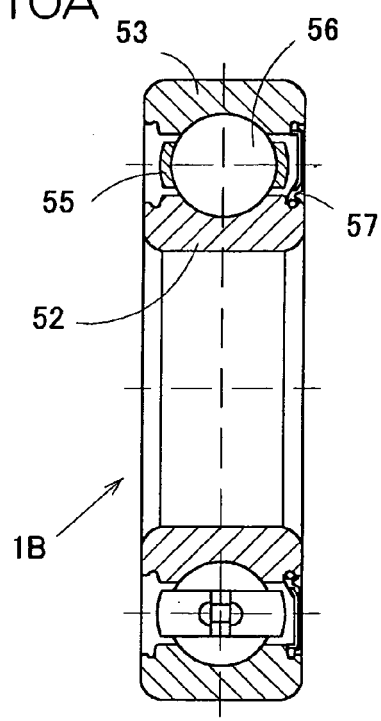
FIGS. 10A and 10B are sectional and partially enlarged sectional views, showing another example of the machine component, respectively.
Figure 10B:
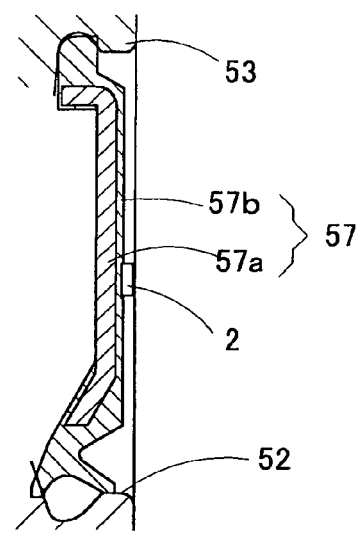

It is to be noted that although in describing the foregoing embodiment, the IC tags 2 have been shown and described as attached to the roller retainer 5, the present invention may be equally applied to any other bearing component of the rolling bearing assembly 1 than the roller retainer 5, for example, the inner race 3, the outer race 4 or the sealing member 57 affixed to the inner race 4 or the outer race 4 (as shown in FIG. 10B). Also, the present invention can be applied not only to the rolling bearing assembly 1, but also to a machine component including the rolling elements such as, for example, a constant velocity joint or a ball screw, or any other various machine components. In such case, where the IC tags 2 are to be attached to a component part of the machine component that is used in a stationary state, only one of the IC tags 2 may be attached to the machine component and the other of the IC tags 2 may be attached to an accessory to the machine component. Alternatively, the plural IC tags 2 may be attached to the machine component and an additional IC tag 2 may then be attached to an accessory to the machine component. The term "accessory" referred to hereinbefore and hereinafter is intended to encompass a handling manual of the machine component, a packaging container or a part indicating the contents of the package.

The embodiment, in which the accessory is the handling manual, will now be described with particular reference to FIGS. 4A to 6. The handling manual 11 according to this embodiment describes how to handle the rolling bearing assembly 1 with the IC tags attached thereto such as shown in and described with reference to FIGS. 1A and 1B or any other machine component (not shown).

Figure 4C:
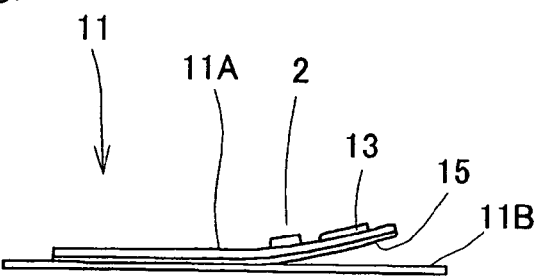
FIG. 4C is a plan view showing a peeling step.
Figure 4A:
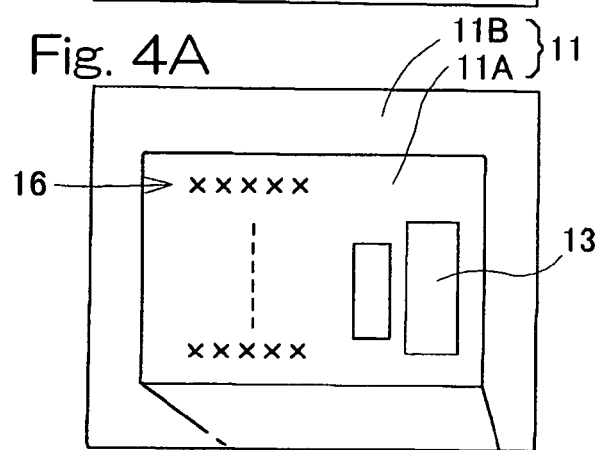
FIG. 4A is a front elevational view of a handling manual according to another preferred embodiment of the present invention.
Figure 4B:
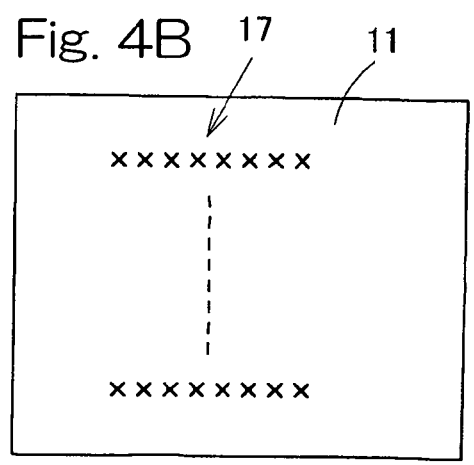
FIG. 4B is a rear view of the handling manual.
Figure 4D:
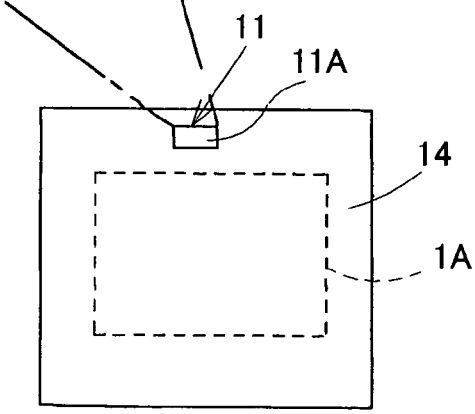
FIG. 4D is a conceptual diagram showing the handling manual being pasted to a machine.

This handling manual 11 includes a display module 13 for presenting the status of deterioration of the machine component and is, as shown in FIG. 4D, adapted to be applied to a machine 14 incorporating the machine component 1A. The machine component 1A is of a kind tending to deteriorate with passage of time of use thereof, including that tending to deteriorate naturally with passage of time of use thereof and is generally represented by, for example, a bearing assembly such as a rolling bearing assembly or a shaft coupling such as a constant velocity joint. The machine 14 incorporating the machine component 1A may be, for example, an iron and steel manufacturing equipment such as rolling mill, paper manufacturing machine or railway vehicles.

The handling manual 11 is made up of a backing sheet 11B and a sticker 11A pasted to the backing sheet 11B. The sticker 11A is adapted to be pasted to the machine 14. This sticker 11A has a layer of bonding material 15 applied to a rear surface thereof and is pasted to the backing sheet 11A through the bonding layer 15. For the bonding layer 15, an adhesive compound of a kind enabling the sticker 11A, after having been removed from the backing sheet 11B, to be re-pasted to another object is employed. The sticker 11A also has a descriptions display area 16 provided on a front surface thereof, in which explanatory notes concerning the machine component 1A are described, and is provided with the deteriorating status display module 13 and the IC tags 2. The backing sheet 11B has, on its rear surface, a caution display area 17 in which cares to be taken during handling of the machine component 1A, particularly cares to be taken when installing are described. Alternatively, the caution display area 17 may be defined in a portion of the front surface of the sticker 11A, which is free of any bonding material layer. The descriptions display area 16 and the caution display area 17 are utilized to present a visual indication of alphanumerical characters and/or codes descriptive of the cares and cautions, respectively, that are printed thereon.

Contents described in the descriptions display area 16 appearing in the sticker 11A and contents stored in the IC tag 2 also appearing in the sticker 11A include items of the fundamental specification of the machine component 1A such as the model number and internal specification thereof, and the contact address to be utilized during repair and maintenance. In particular, where the machine component 1A has a unique internal specification separate from the model number, such internal specification concerning the unique specification is described. This internal specification may be a detailed model number added to the standard model number. Examples of languages appearing in the descriptions display area 16 and contents stored in the IC tag 2 may read, "This is a XXX bearing designed to meet the specification required by the service conditions of this machine. Should replacement of this bearing be required, specify 'XXX Bearing'." The "XXX Bearing" referred to above designates the trade name used by the bearing manufacturer to represent a specific bearing assembly. In addition thereto, the specific name of the bearing assembly and the contact address of the bearing manufacturer are described. The contents stored in the IC tag 2 can be read through a screen of the IC tag read/write device 20 of a handy type.

The backing sheet 11B is discarded at any time after it has served the purpose and has the caution display area 17 in which cares to be taken during installation are described. By way of example, the following cautions may be described:

"When mounting the bearing assembly, don't hammer the bearing end faces directly. Apply a cover plate to the bearing end faces when hammering.

Remove dust, burrs and chips appearing in shafts and boxes.

Avoid heating of the bearing assembly to XX° C. or higher when shrink fitting."

Figure 5A:
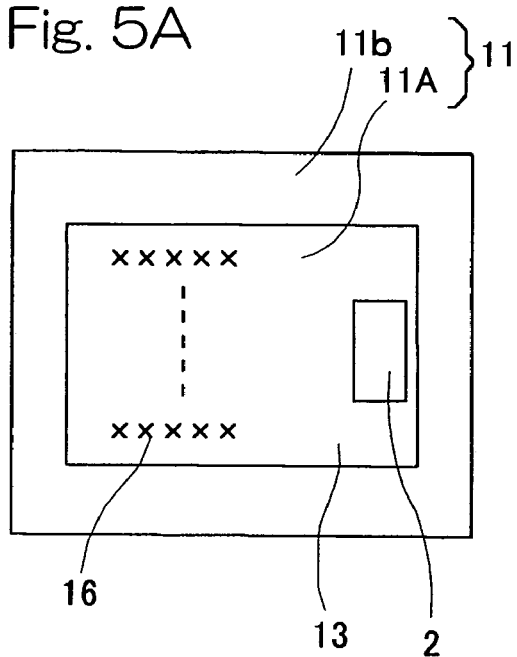
FIGS. 5A and 5B are front elevational and rear views showing a modified form of the handling manual, respectively.
Figure 5B:
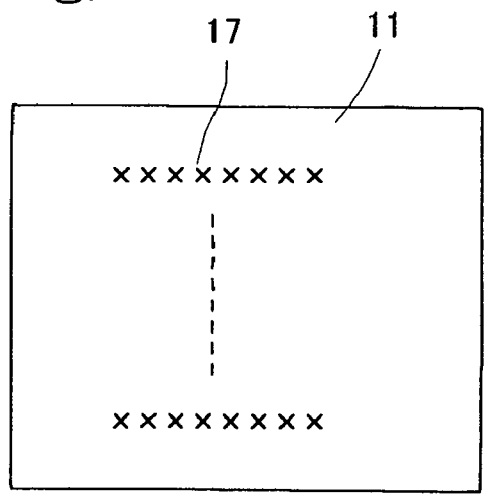

The deteriorating status display area 13 is utilized to indicate the status of deterioration of the machine component 1A in terms of a change of the environment of the deteriorating status display area 13 with passage of time of use of the machine component 1A. Specifically, in the illustrated embodiment, the deteriorating status display area 13 makes use of a heat sensitive color or any other medium that provides a visually recognizable change and is in the form of, for example, a heat sensitive paper having its color variable with change of the temperature. This heat sensitive paper is of a kind, in which a temperature indicating medium having its color variable with increase of the temperature is specially processed, and a commercially available heat sensitive paper generally referred to as "Thermo Label" or "Heat Label" can be suitably employed therefor. The heat sensitive paper forming the deteriorating status display module 13 is, in the illustrated embodiment, provided in a portion of the sticker 11A, but the sticker 11A in its entirety may be a heat sensitive paper as shown in FIGS. 5A and 5B, with the required descriptions printed thereon. Even in this case, the IC tag 2 is pasted to the sticker 11A.

The deteriorating status display module 13 may make use of a irreversible temperature indicating medium. In other words, the deteriorating status display module 13 may be of a kind, in which a discolored condition can be maintained at a maximum temperature and does not fade to the original color even though the temperature subsequently lowers. If the irreversible display module 13 is employed, the deteriorating status display module 13 may be designed to be replaceable with respect to the handling manual 11.

Hereinafter, the manner of handling of the machine component utilizing this handling manual 11 will be described. This handling manual 11 is delivered in the form contained in a packaging box (not shown) together with the machine component 1A at the time of delivery of such machine component 1A. A custom servicing person of the manufacturer of the machine component or a custom unwraps the packaging box, then looks through the cautions shown in the backing sheet 11B of the handling manual 11 at the time of installation of the machine component 1A into the machine 14 and finally performs the installation while observing the cautions. Thereafter, the backing sheet 11B is peeled off from the sticker 11A of the handing manual 11 as shown in FIG. 4C and the sticker 11A is then pasted to a portion of the machine 14 that is readily recognized visually by the servicing person or custom. It is, however, to be noted that the place must be where the deteriorating status display module 13 of the sticker 11A can be sensitive to influences brought about by the temperature of the machine component 1A.

Figure 6:
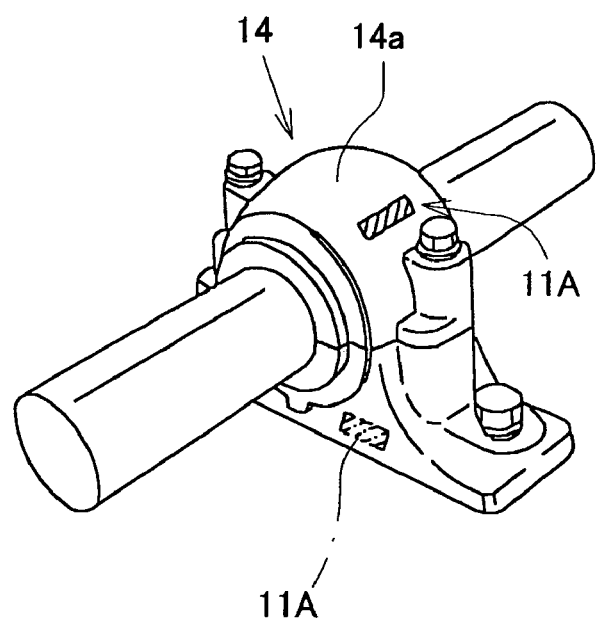
FIG. 6 is a perspective view of a machine having the handling manual pasted thereto.
Figure 7:
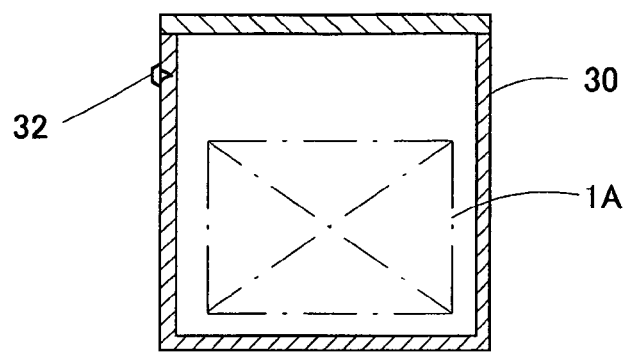
FIG. 7 is a sectional view showing a conceptual construction of a packaging container for the machine component with the IC tag attached thereto.
Figure 8A:
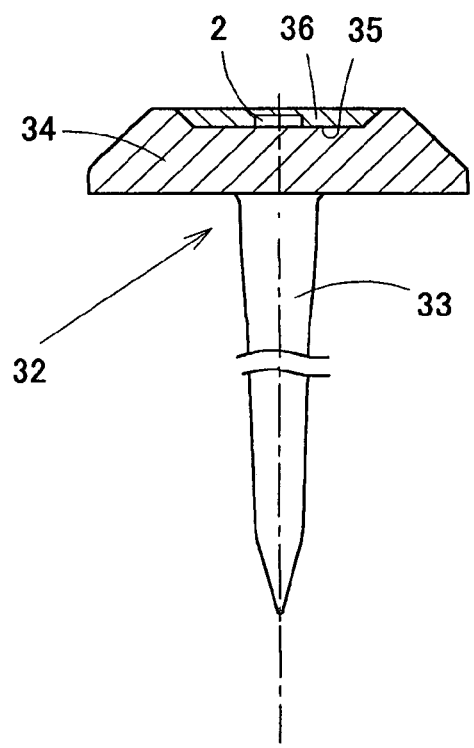
FIGS. 8A and 8B are partly sectioned front elevational and top plan views showing an example of a rivet with the IC tag attached thereto, respectively.
Figure 8B:
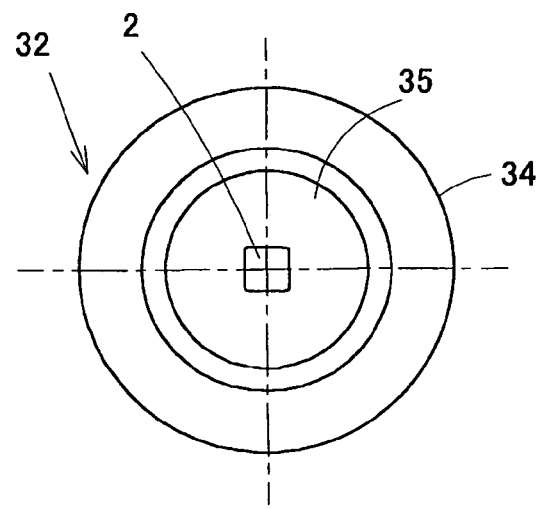

FIG. 6 illustrates an example in which the machine 14 is an iron and steel manufacturing equipment and the machine component 1A is a rolling bearing assembly for supporting a roller of the iron and steel manufacturing equipment. In this case, the sticker 11A is pasted to a top or front surface of a bearing housing 14a accommodating therein the rolling bearing assembly in the machine 14. The bearing housing 14a shown therein is a Plummer block type.

It is to be noted that where the machine 14 is a railway vehicle and the machine component 1A is a rolling bearing assembly for supporting a wheel of the railway vehicle, the sticker 11A is pasted to, for example, a front lid (not shown) of a bearing housing.

As hereinabove described, while the sticker 11A is pasted to the machine 14, the servicing person looks through the sticker 11A after the machine 14 has been used or reads out the contents stored in the IC tag 2 on the sticker 11, followed by maintenance to be performed on the machine 14 in accordance with the contents described or the contents stored. This maintenance includes a work of recognizing the description in the sticker 11A or the contents stored in the IC tag 2 and replacing the machine component 1A with a new machine component of the same model number and the internal specification.

According to the foregoing handling manual 11, since the handing manual 11 in the form of the sticker 11A can be pasted to the machine 14 as hereinabove described, the fundamental specification of machine components such as, for example, bearing assemblies can be recorded and stored easily and with no error, in connection with customers maintenance parts of the machine parts manufacturer. Also, since the handling manual 11 is pasted directly to the machine 14, everybody can ascertain the descriptions in the handling manual at situ. In addition, since the handling manual 11 is provided with the deteriorating state display module 13 of a kind having its color variable with change in temperature, check of a change appearing in the color of the deteriorating status display module 13 with eyes during an inspecting patrol makes it possible to ascertain the presence or absence of an abnormality occurring in the machine component 1A. On the other hand, if the irreversible temperature indicating medium is used for the deteriorating status display module 13, inspection of the traveling condition can be substantially possible even during the shutdown inspection such as necessarily observable with the railway vehicles.

In particular, the provision of the IC tag 2 in the handling manual 11, even when the surface of the description formed by a stick or the like becomes so contaminated as to render the description to be intelligible, the description can be electronically read out. Also, since the contents described can be electronically read out, it is possible to make, in situ, a reference about the availability of the replacement parts and/or to make a delivery arrangement to the manufacturer of the machine components and, therefore, the required documentation can be quickly performed and any possible error in transcribing records can be completely avoided.

It is to be noted that although in the foregoing embodiment the handling manual 11 has been shown and described as including the backing sheet 11B and the sticker 11A, the backing sheet 11B is not always essential and the sticker 11A in its entirety may form the handling manual 11. Even in this case, the caution display area 17 may be formed on the rear surface thereof which defines an adhesive surface. Also, where the backing sheet 11B is employed, it may not be always comprised of a single sheet, but a plurality of sheets or a packaging box.

The deteriorating status display module 13 provided in the handling manual 11 may include, other than the temperature sensitive medium, a medium sensitive to a leaking lubricant or the like, or a medium in which the status of deterioration can be written without having no function responsive to the environment. Also, the deteriorating status display module 13 may not always be employed. Even in such case, the contents displayed of the handling manual 11 pasted to the machine 14, particularly the unique internal specification of the machine component 1A can easily be recognized and, therefore, the maintenance can be easily performed.

In addition, the handing manual 11 may not be always in the form of a adhesive sticker, but in the form of a card, tag or note, or any other form that can be fixed to the machine 14 by the use of a screw or that can be seized in the machine 14 and may be in the form of a block or pin that can be inserted into an appropriate portion of the machine 14.

Figure 9A:
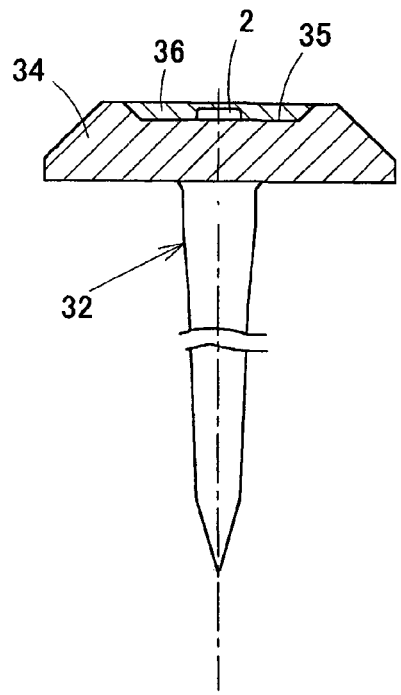
FIGS. 9A and 9B are partly sectioned front elevational and top plan views showing another example of the rivet with the IC tag attached thereto, respectively.
Figure 9B:
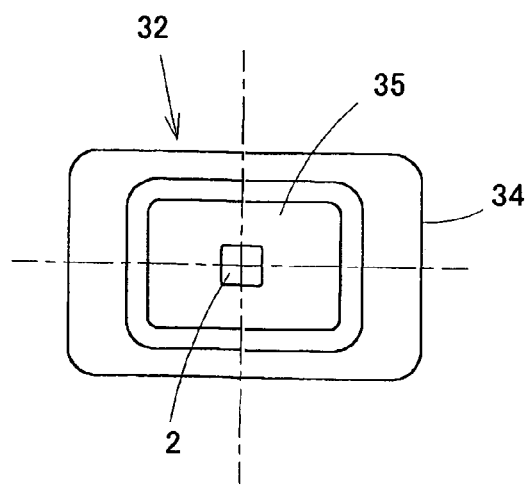

FIGS. 7 to 9B illustrates an embodiment that is applicable where the accessory part referred to above is comprised of a package contents display item such as, for example, a plaque adapted to be fitted to a package. In this embodiment, the package contents display item fitted to the package 30 containing the machine component 1A is shown as in the form of an IC tag incorporated rivet 2, i.e., a rivet having an IC tag 2 secured thereto. This IC tag incorporated rivet 2 includes a needle portion 33 and a head portion 34, with the IC tag 2 embedded in the head portion 34. Although the head portion 34 may be of a round shape as shown in FIG. 8B or a rectangular shape as shown in FIG. 9B, the head portion 34 is preferably flattened having a center portion thereof inwardly depressed to define a cavity 35. The IC tag 2 is secured to a bottom surface of the cavity 35. A surface of the IC tag 2 opposite to the bottom surface of the cavity 35 is setback or sunk inwardly from a peripheral edge of the cavity 35. The cavity 35 with the IC tag 2 therein is sealed with a resin molding 36. Although the IC tag 2 referred to above may be of the structure shown in and described with reference to FIGS. 2 and 3, it may be a read-only IC tag or a writable IC tag.

According to the foregoing construction, after the machine component 1A having the IC tag 2 secured thereto has been enclosed within a packaging container 30, for example a wooden box, the IC tag incorporated rivet 32 is driven to the packaging container 30 before it is shipped to a customer. This IC tag 2 is rendered to be a read-only IC tag if it is used only for transmitting information in one way from the manufacturer to the customer. Where the IC tag 2 is in the form of a writable IC tag, it is possible to write the parts number such as, for example, the relevant bearing number on a case-by-case basis after the machine component 1A has been enclosed within the packaging container 30 and the IC tag incorporated rivet 32 has been subsequently driven to such packaging container 30. Also, it can be used for acknowledging from the customer the designated date of next delivery and/or the number of items to be delivered. In other words, it can be used in order placement according to a so-called "just-in-time system". The machine component 1A shipped to and then accepted by the customer can be inspected and supervised with the use of a handy tag reader for electronically reading out the information that is stored in the IC tag incorporated rivet 32 accompanying the packaging container 30.

To describe the conventional manner of packaging, a large-size mechanical component, for example, a large-size bearing assembly is generally encased in a wooden box designed for packaging and transporting and a plaque bearing the model number of the bearing assembly, the number of bearings packaged, the name of a customer and so on is affixed to the wooden box.

This wooden box is, after it has been delivered to the customer, discarded or returned to the bearing manufacturer for reuse. In other words, the wooden box is employed in the form of a returnable container. The wooden box returned to the bearing manufacturer is reused after-the plaque has been replaced or rewritten. As a result, frequent reuse of the single wooden box results in considerable contamination or damage of the wooden box and will become no longer reused.

Also, even in the case where check of the incoming merchandise against purchase is made on the part of the customer, it has been necessitated that information (legends or any other descriptions) appearing in the plaque must be once written down in a note and be again inputted to a computer for administrative use. For this reason, complicated and time-consuming procedures have been required, often accompanied by an error in making records.

However, if the IC tag incorporated rivet 32 according to the foregoing embodiment is employed, such problems and inconveniences as discussed above can be eliminated. The function and effects thereof are as follows:

Possible contamination and/damage of the wooden box for packaging of the component parts are minimized and the wooden box can be reused for a prolonged period of time. Also, a work of making the display plaque during packaging can be simplified.

The check and management of incoming merchandise against purchase that are to be performed on the part of the customer can be achieved electronically. Because of this, the work can be simplified and the erroneous recording does not occur. Even if the place of delivery to the customer is remote from its administrative office, data obtained as a result of the check can be quickly transmitted by wireless to the computer for administrative use.

FIGS. 10A and 10B illustrate a further preferred embodiment of the present invention. The IC tag equipped machine component, i.e., the machine component having the IC tag 2 affixed thereto according to this embodiment is shown as applied to a deep groove ball bearing assembly having a sealing system. The machine component, now identified by 1B includes a row of rolling elements 56 in the form of balls retained by a ball retainer 55 and interposed between an inner race 52 and an outer race 53. The outer race 53 is provided with a sealing member 57 for sealing one of opposite open ends of an annular bearing space delimited between the inner and outer races 52 and 53, and the IC tag 2 is embedded in this sealing member 57. The sealing member 57 includes an annular core metal 57*a* and an annular elastic element 57*b* made of a rubber material or a synthetic resin and formed with one or more sealing lips. The IC tag 2 is either secured to the sealing member 57 by the use of any suitable bonding material or embedded in the elastic element 57*b*.

Figure 11A:
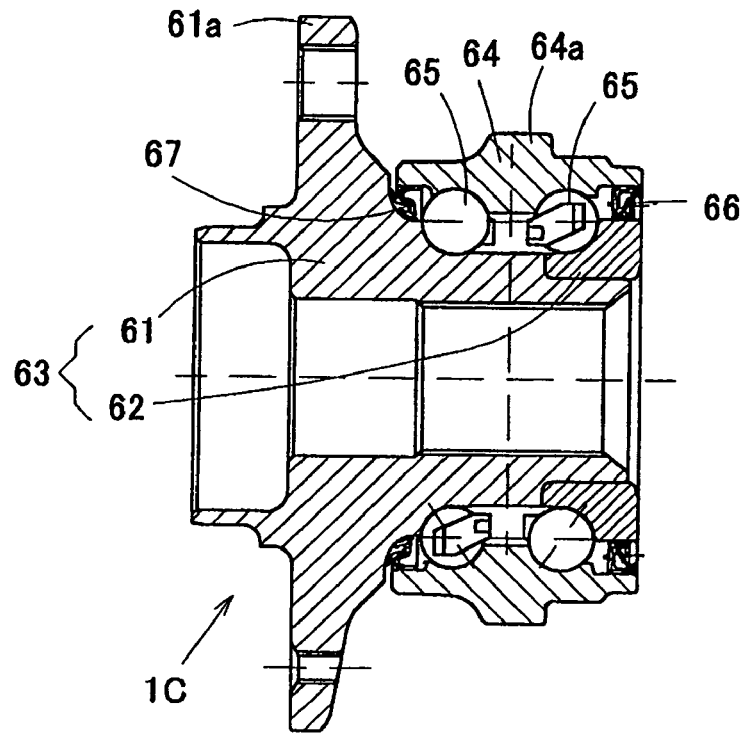
FIGS. 11A and 11B are sectional and partially enlarged sectional views, showing a further example of the machine component, respectively.
Figure 11B:
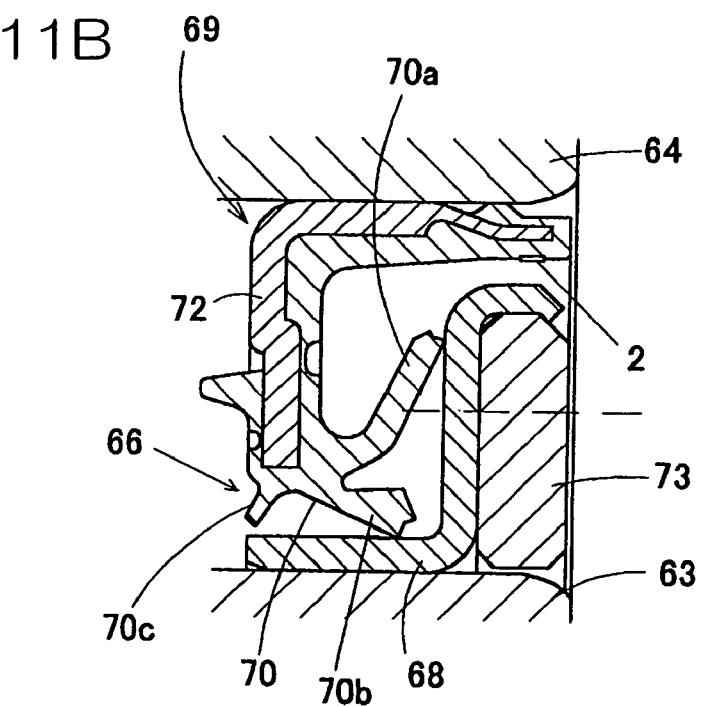

FIGS. 11A and 11B illustrate a still further preferred embodiment of the present invention. The IC tag equipped machine component according to this still further embodiment is such that in a wheel support bearing assembly for supporting a vehicle wheel, the IC tag 2 is secured to a sealing member of such bearing assembly. The machine component, now identified by 1C, employed in the practice of this embodiment, includes dual rows of rolling elements 65 interposed between an inner member 63, made up of a hub axle 61 and an inner race segment 62, and an outer member 64. The hub axle 61 has a wheel mounting flange 61*a* protruding outwardly from an outer periphery thereof and, on the other hand, the outer member 64 has a connecting flange 64*a* for connection with a vehicle body structure. Opposite open ends of an annular bearing space delimited between the inner member 63 and the outer member 64 are closed by respective sealing members 66 and 67. One of the sealing members, that is, the inboard sealing member 66 includes, as shown in FIG. 11B on an enlarged scale, a first sealing element 68, which serves as a slinger, and a second sealing element 69 held in face-to-face relation with the first sealing element 68. The second sealing element 69 includes an elastic segment 70 having a plurality of sealing lips 70*a* to 70*c* slidingly engageable with the first sealing element 68, which segment 70 is provided in an annular core metal 72. The first sealing element 68 is provided with a magnetic encoder 73 having a plurality of magnetic poles deployed in a direction circumferentially thereof for the detection of revolutions. The first sealing element 68 and the second sealing elements 69 are mounted on an outer periphery of the inner member 63 and an inner periphery of the outer member 54, respectively. The IC tag 2 is secured to the vicinity of an axial outer end of the second sealing element 69.

In the embodiments shown respectively in FIGS. 10A, 10B, 11A and 11B, the IC tag 2 may be secured to either a single portion of or a plural portions of the sealing member 57 or of the second sealing element 68. Where the IC tag 2 is secured to the plural portions of the sealing member 57 or of the second sealing element 68, the IC tags 2 are preferably equidistantly spaced from each other in a direction circumferentially thereof. In either case, the IC tag 2 has recorded therein information similar to that discussed in connection with any of the previously described embodiments, for example, attribute information including, for example, bearing identifying number and lot number. Where the IC tag 2 is secured to the single portion of the sealing member 57 or of the second sealing element 68, it is preferred that the IC tag 2 be attached to an accessory to the machine component lB or 1C, for example, the packaging container and/or the handling manual.

What is claimed is:

1. An IC tag equipped machine component comprising a plurality of IC tags attached to a unitary object including a machine component wherein
    the plurality of IC tags have different information stored therein,
    the machine component is a rolling bearing assembly that includes a rotatable component part, the rotatable component part is a roller retainer,
    the plurality of IC tags are attached to the rotatable component part and positioned in symmetrical relation with each other about an axis of rotation, and
    the attachment provides for balanced rotation of the rotatable component part.

2. The IC tag equipped machine component as claimed in claim 1, wherein the number of the plural IC tags attached to the roller retainer is two and those two IC tags are attached spaced 180 degrees from each other about the axis of rotation.

3. The IC tag equipped machine component as claimed in claim 1, wherein one of the IC tags has recorded therein handling instructions associated with the machine component.

4. The IC tag equipped machine component as claimed in claim 1, further comprising an accessory with division made between the machine component and the accessory.

5. The IC tag equipped machine component as claimed in claim 4, wherein the accessory is a package contents display item to be attached to a packaging container of the machine component and wherein one of the IC tags is attached to this package contents display item.

6. The IC tag equipped machine component as claimed in claim 5, wherein the package contents display item is a rivet having a needle portion and a head portion and wherein the IC tag is embedded in the head portion.

7. The IC tag equipped machine component as claimed in claim 4, wherein the accessory is a handling manual of the machine component tending to deteriorate with passage of time of use thereof, and wherein the handling manual comprises one of the plurality IC tags having stored therein contents of how to handle the machine component and a deteriorating status display module for presenting the status of deterioration of the machine component.

8. The IC tag equipped machine component as claimed in claim 1, wherein the machine component is a rivet comprising a needle portion, and a head portion, and wherein one of the plurality of IC tags is embedded in the head portion.

9. The IC tag equipped machine component as claimed in claim 4, wherein the accessory is a handling manual of the machine component and wherein the handling manual includes one of the plural IC tags, a deteriorating status display module for presenting the status of deterioration of the machine component and has stored therein handing instructions associated with the machine component, the handling manual being adapted to be attached to a machine incorporating the machine component or to the machine component itself.

\* \* \* \* \*